(12) United States Patent
Sheng et al.

(10) Patent No.: US 7,456,624 B2
(45) Date of Patent: Nov. 25, 2008

(54) PWM CONTROL SCHEME UNDER LIGHT LOAD

(75) Inventors: Kang Sheng, Taoyuan County (TW); Yu-Chang Chen, Nan-Tou Hsien (TW); Chih-Ning Chen, Taipei (TW)

(73) Assignee: Anpec Electronics Corporation, Hsin-Chu (TW)

( * ) Notice: Subject to any disclaimer, the term of this patent is extended or adjusted under 35 U.S.C. 154(b) by 133 days.

(21) Appl. No.: 11/693,724

(22) Filed: Mar. 30, 2007

(65) Prior Publication Data

US 2008/0018314 A1 Jan. 24, 2008

Related U.S. Application Data

(60) Provisional application No. 60/807,819, filed on Jul. 19, 2006.

(51) Int. Cl.
*G05F 1/575* (2006.01)
*G05F 1/46* (2006.01)
(52) U.S. Cl. ....................... 323/285; 323/299
(58) Field of Classification Search ............... 323/224, 323/265, 282, 284, 285, 299, 351
See application file for complete search history.

(56) References Cited

U.S. PATENT DOCUMENTS

| | | | |
|---|---|---|---|
| 5,745,352 A | 4/1998 | Sandri et al. | |
| 6,396,252 B1* | 5/2002 | Culpepper et al. | 323/285 |
| 6,661,679 B1 | 12/2003 | Yang et al. | |
| 6,724,174 B1* | 4/2004 | Esteves et al. | 323/224 |
| 6,954,054 B2* | 10/2005 | Brown | 323/283 |
| 7,161,333 B2* | 1/2007 | Soch | 323/224 |
| 7,245,113 B2* | 7/2007 | Chen et al. | 323/271 |
| 7,327,127 B2* | 2/2008 | Ho | 323/271 |
| 7,408,333 B2* | 8/2008 | Chen et al. | 323/282 |

* cited by examiner

*Primary Examiner*—Gary L Laxton
(74) *Attorney, Agent, or Firm*—Winston Hsu

(57) ABSTRACT

A DC-DC converter capable of operating in a pulse-skipping mode for transforming power provided by a power generator for a load circuit includes a driving circuit for generating a gate driving signal according to a feedback signal and a pulse-skipping-mode control signal, a converter circuit for transforming power provided by the power generator for the load circuit according to the gate driving signal, a feedback circuit for generating the feedback signal for the driving circuit according to a feedback voltage of the load circuit, and a pulse-skipping-mode control circuit for generating the pulse-skipping-mode control signal and adjusting on-time of the generated pulse-skipping-mode control signal according to voltages outputted from the power generator and the converter circuit, so as to adjust voltage outputted from the converter circuit via the driving circuit.

7 Claims, 7 Drawing Sheets

| | S | R | Q |
|---|---|---|---|
| Set | 1 | 0 | 1 |
| | 0 | 0 | 1 |
| Reset | 0 | 1 | 0 |
| | 0 | 0 | 0 |

Fig. 5

PWM CONTROL SCHEME UNDER LIGHT LOAD

CROSS REFERENCE TO RELATED APPLICATIONS

This application claims the benefit of U.S. Provisional Application No. 60/807,819, filed on Jul. 19, 2006 and entitled "PWM Control Scheme Under Light Load" the contents of which are incorporated herein by reference.

BACKGROUND OF THE INVENTION

1. Field of the Invention

The present invention relates to a DC-DC converter capable of operating in a pulse-skipping mode, and more particularly, to a DC-DC converter capable of automatically adjusting a width of a pulse-skipping-mode control signal according to an input voltage and an output voltage.

2. Description of the Prior Art

Please refer to FIG. 1, which depicts a schematic diagram of a prior art DC-DC converter 100. The DC-DC converter 100 provides power for a load circuit 112, and includes a driving circuit 102, a converter circuit 103, and a feedback circuit 110. The converter circuit 103 includes transistors 104 and 106, and an inductor 108. The driving circuit 102 drives the transistors 104 and 106 according to a feedback signal from the feedback circuit 110, so as to adjust an output voltage VOUT of the inductor 108. Firstly, the driving circuit 102 turns on the transistor 104 and turns off the transistor 106 so that the source current of the transistor 104 flows into the inductor 108 to store energy. Subsequently, the driving circuit 102 turns off the transistor 104 and turns on the transistor 106 so that the inductor 108 does not receive energy. Inverse current corresponding to the source current is generated and flows through the transistor 106 and down to a system ground. Therefore, the driving circuit 102 can adjust the output voltage VOUT of the inductor 108 by switching on and off of the transistors 104 and 106.

Therefore, electronic devices can be operated with power provided by the DC-DC converter 100. However, as energy-saving aspects become significant, how to reduce power consumption when output load is light has become an objective of industrials. The prior art has developed some methods, such as pulse-skipping-mode (PSM), burst-mode, and off-time-modulation techniques, for reducing switching and rated losses of a DC-DC converter under light or no load conditions.

The PSM technique, provided by SGS-Thompson and National Semiconductor, is achieved by skipping switching pulses according to a load condition, so as to reduce power loss. Please refer to FIG. 2, which depicts a schematic diagram of the PSM technique. The main concept of the PSM technique is to skip a part of switching pulses when a system operates with or without a light load, so as to decrease switching frequencies of transistors under light load conditions.

Therefore, the PSM technique can reduce power consumption of the DC-DC converter 100 under light load conditions by decreasing the switching frequencies of the transistors. The prior art has disclosed related circuits for implementing the PSM technique. However, the prior art mostly adopts a control method, constant inductor peak current, and thereby a peak current of the inductor 108 is restricted in a specific range. Under this circumstance, in order to avoid the situation that the current of the inductor 108 in the pulse-skipping mode is larger than that in a normal mode, or a continuous conduction mode (CCM), inductance of the inductor 108 is under restriction, resulting in inflexibility on selecting the inductor 108.

For example, U.S. Pat. No. 5,745,352, "DC-to-DC Converter Functioning in a Pulse-skipping Mode with Low Power Consumption and PWM Inhibit", discloses a DC-to-DC converter capable of operating in a pulse-skipping mode, which outputs constant peak current of an inductor. The DC-to-DC converter of U.S. Pat. No. 5,745,352 detects voltage of an external resistor for obtaining current information and compares the obtained current information with a constant voltage, so as to adjust a peak current. When an output voltage is lower than a threshold value, transistors are switched and current flows into the inductor. Then, current of the inductor is accumulated and outputted to a load at last. A shortcoming of the DC-to-DC converter is that the current of the inductor in PSM is possibly larger than that in CCM. Thus, inductance of the inductor is under restriction.

Furthermore, U.S. Pat. No. 6,661,679, "PWM Controller Having Adaptive Off-time Modulation for Power Saving", discloses a PWM controller capable of saving power via an off-time modulation. The PWM controller firstly detects a feedback voltage and an input voltage of a load, transforms the feedback and input voltages into currents, and makes use of currents carrying information of the feedback and input voltages for modulating off-time. Thus, off-time is a function of two variables, the feedback and input voltages, while on-time is determined by a period of a constant peak current, similar to the DC-to-DC converter of U.S. Pat. No. 5,745,352. U.S. Pat No. 6,661,679 only describes the relation that off-time is proportional to the feedback and input voltages, but does not illustrate the relation between on-time and off-time in CCM.

SUMMARY OF THE INVENTION

It is therefore an object of the claimed invention to provide a DC-DC converter capable of operating in a pulse-skipping mode.

The present invention discloses a DC-DC converter capable of operating in a pulse-skipping mode for transforming power provided by a power generator for a load circuit, the DC-DC converter comprises a driving circuit for generating a gate driving signal according to a feedback signal and a pulse-skipping-mode control signal; a converter circuit coupled to the power generator, the driving circuit, and the load circuit for transforming power provided by the power generator for the load circuit according to the gate driving signal; a feedback circuit coupled to the driving circuit and the load circuit for generating the feedback signal for the driving circuit according to a feedback voltage of the load circuit; and a pulse-skipping-mode control circuit coupled to the driving circuit, the converter circuit, and the power generator for generating the pulse-skipping-mode control signal and adjusting on-time of the generated pulse-skipping-mode control signal according to voltages outputted from the power generator and the converter circuit, so as to adjust voltage outputted from the converter circuit via the driving circuit.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 depicts a truth table of an SR flip-flop.

DETAILED DESCRIPTION

Figure 1:
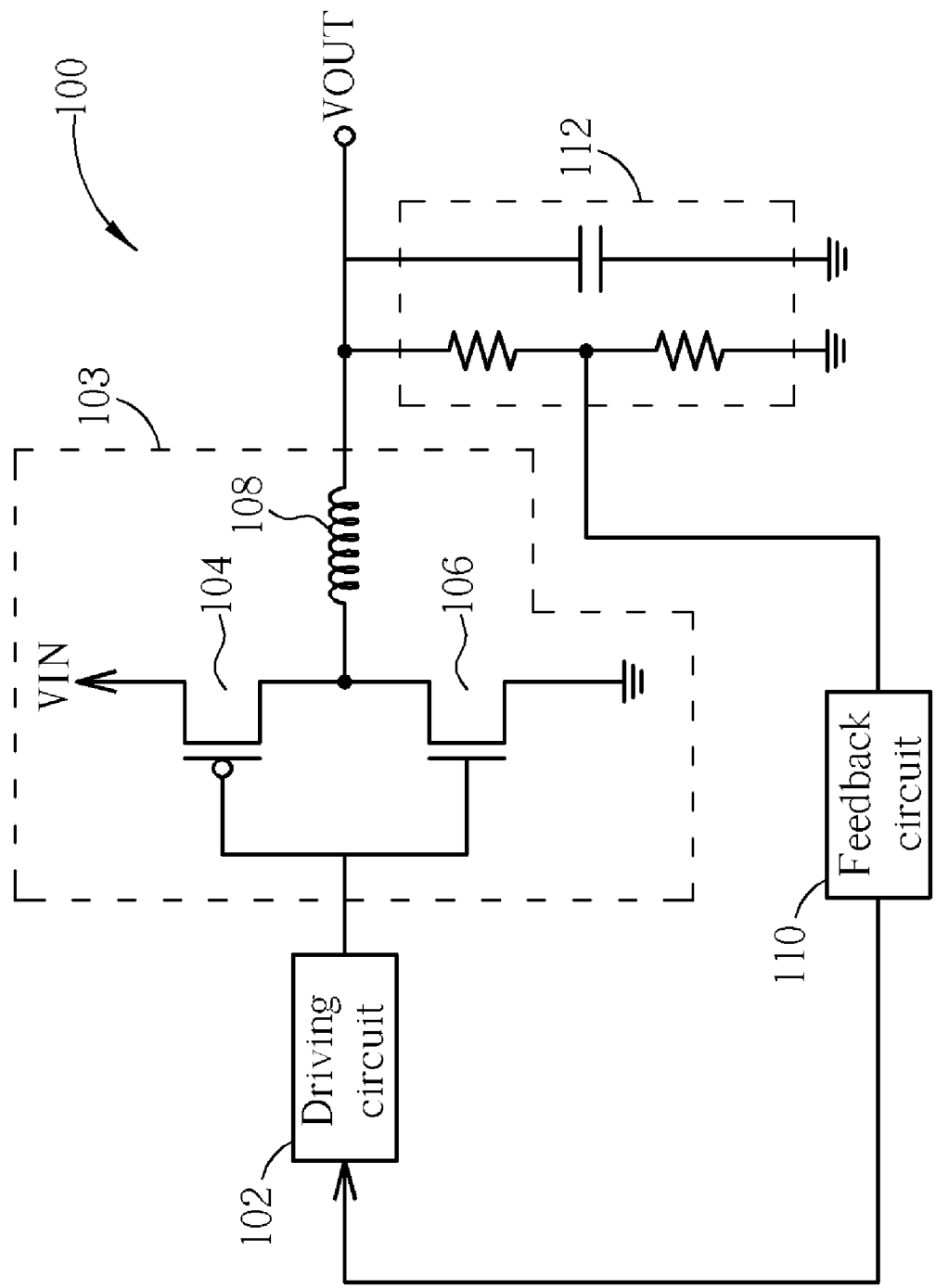
FIG. 1 depicts a schematic diagram of a converter in accordance with the prior art.
Figure 2:
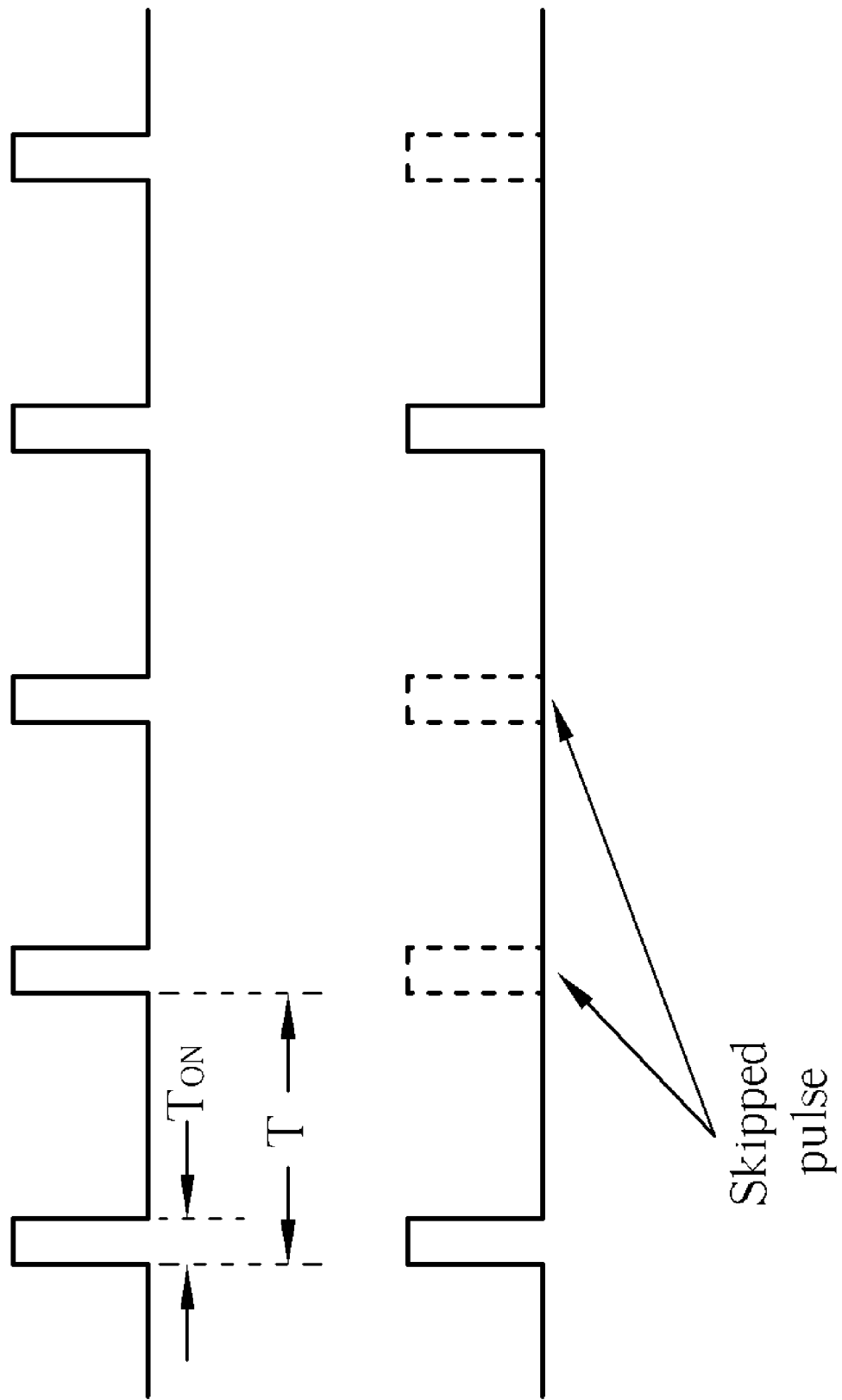
FIG. 2 depicts a concept schematic diagram of a pulse-skipping mode.
Figure 3:
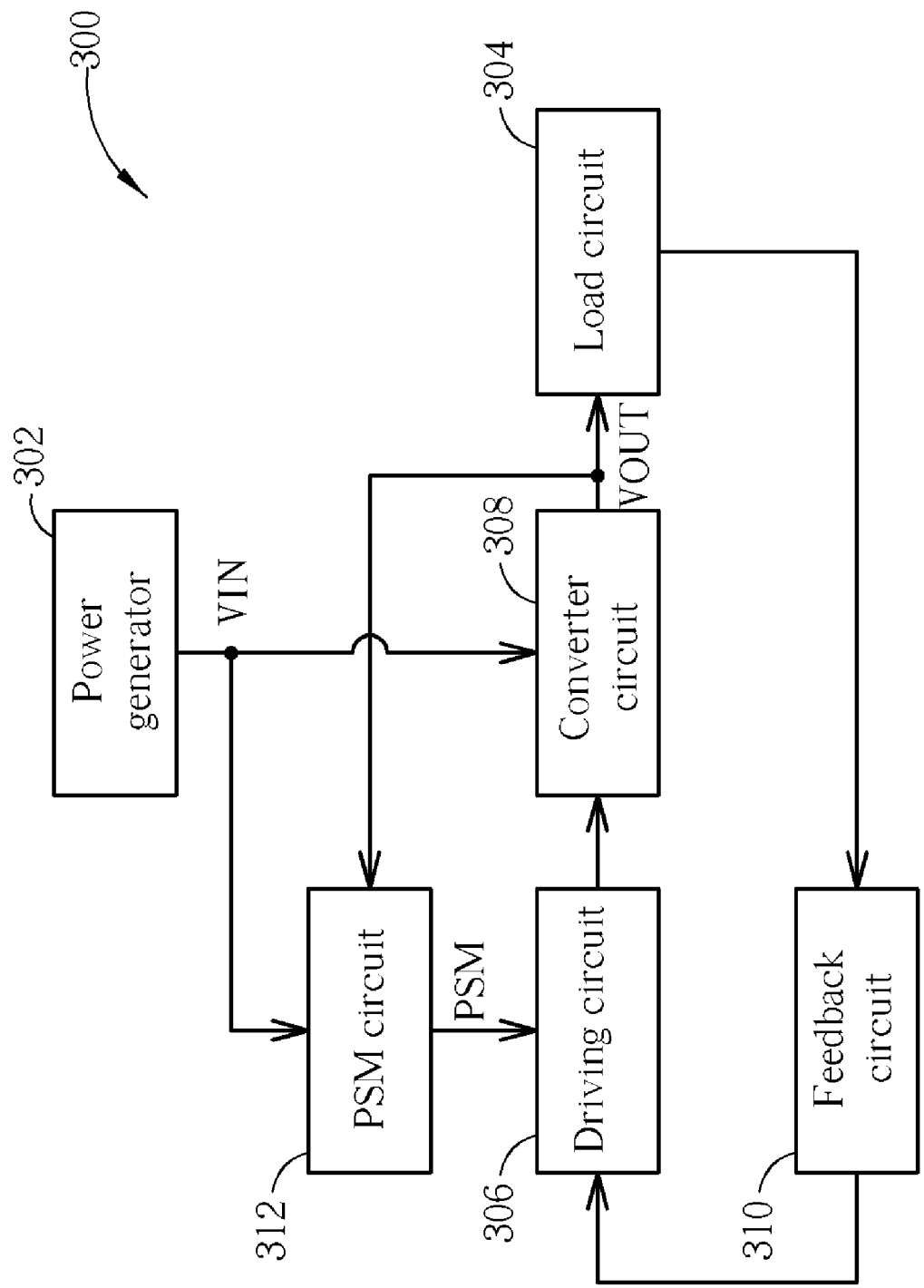
FIG. 3 depicts a schematic diagram of a DC-DC converter capable of operating in a pulse-skipping mode in accordance with an embodiment of the present invention.

Please refer to FIG. 3, which depicts a schematic diagram of a DC-DC converter 300 capable of operating in a pulse-skipping mode in accordance with an embodiment of the present invention. The DC-DC converter 300 is used for receiving and transforming power provided by a power generator 302 for a load circuit 304. The DC-DC converter 300 includes a driving circuit 306, a converter circuit 308, a feedback circuit 310, and a PSM control circuit 312. The converter circuit 308 preferably includes a plurality of transistors for outputting voltage to the load circuit 304 by switching on and off according to a gate driving signal provided by the driving circuit 306. The feedback circuit 310 generates a feedback signal to the driving circuit 306 according to a feedback voltage outputted from the load circuit 304. The PSM control circuit 312 outputs a PSM control signal to the driving circuit 306 and adjusts on-time of the PSM control signal according to an input voltage VIN outputted from the power generator 302 and an output voltage VOUT outputted from the converter circuit 308. Therefore, the driving circuit 306 can adjust on-time and off-time of the transistors in the converter circuit 308 according to the feedback signal outputted from the feedback circuit 310 and the PSM control signal outputted from the PSM control circuit 312, so as to decrease power consumption under light load conditions.

Therefore, in the DC-DC converter 300, the PSM control circuit 312 adjusts on-time of the PSM control signal according to the input voltage VIN outputted from the power generator 302 and the output voltage VOUT outputted from the converter circuit 308, so as to control the gate driving signal of the driving circuit 306. In this way, peak current intensity of an inductor of the converter circuit 308 in PSM is proportional to that in CCM, so that there are no current ripples of the inductor in PSM larger than those in CCM. Therefore, in the present invention, selection of the inductor has flexibility.

Figure 4:
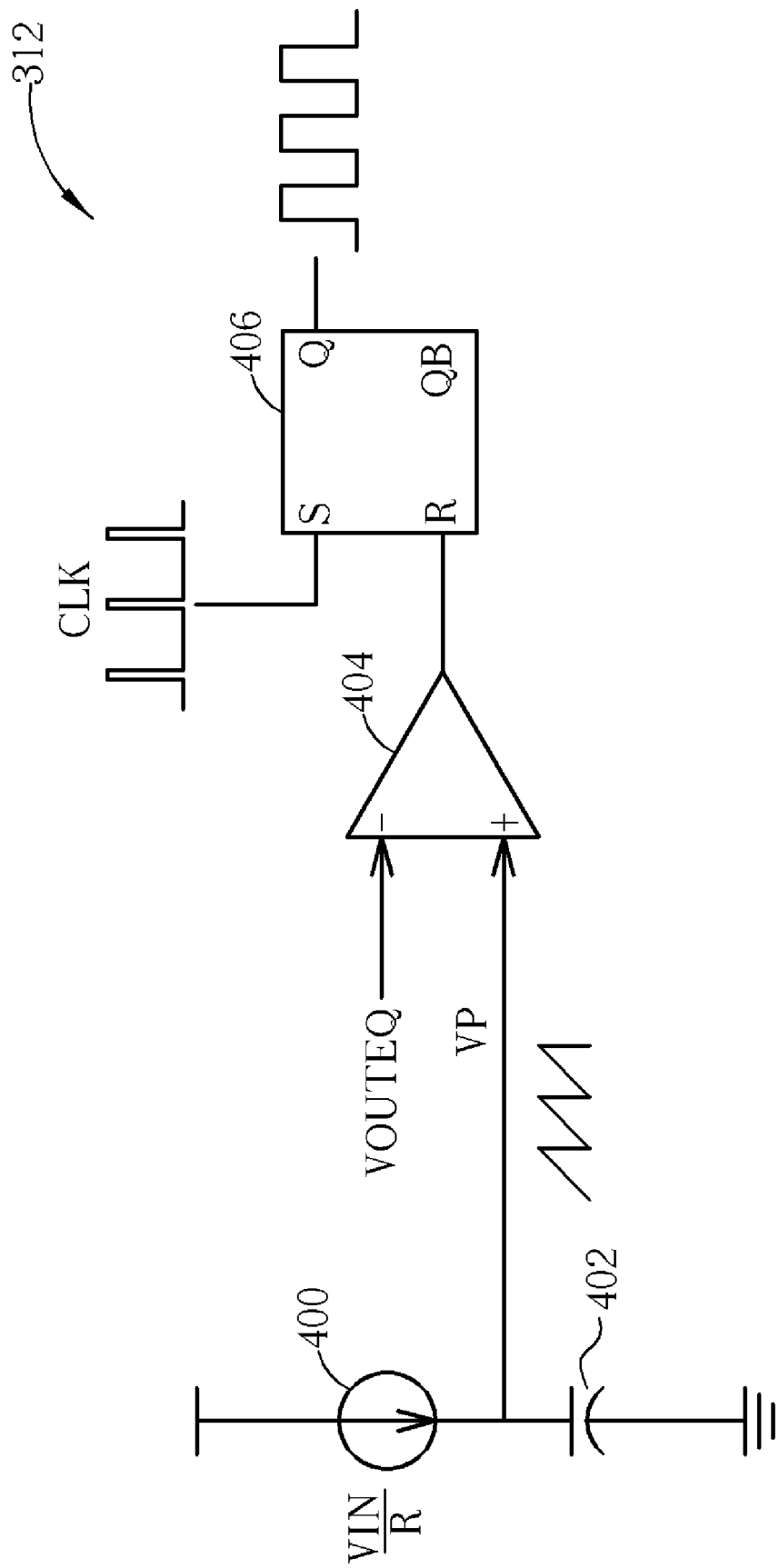
FIG. 4 depicts a schematic diagram of the pulse-skipping-mode control circuit in accordance with FIG. 3.

Please refer to FIG. 4, which depicts a schematic diagram of the PSM control circuit 312. The PSM control circuit 312 includes a current source 400, a capacitor 402, a comparator 404, and an SR flip-flop 406. The current source 400 provides current proportional to the input voltage VIN. For example, the current source 400 generates current, VIN/R, by applying the input voltage VIN to a resistor R. Current generated by the current source 400 charges the capacitor 402. The comparator 404 is utilized for comparing a voltage VP of the capacitor 402 with a DC (direct-current) information VOUTEQ obtained by the voltage VOUT outputted from the converter circuit 308, and thereby outputs a comparison result to the SR flip-flop 406. A set end S of the SR flip-flop 406 is coupled to a clock generator (not shown in FIG. 4), utilized for receiving a clock signal CLK. A reset end R of the SR flip-flop 406 is coupled to the comparator 404, utilized for receiving the compared result from the comparator 404. An output end Q of the SR flip-flop 406 is coupled to the driving circuit 306, utilized for outputting the PSM control signal.

Figure 6:
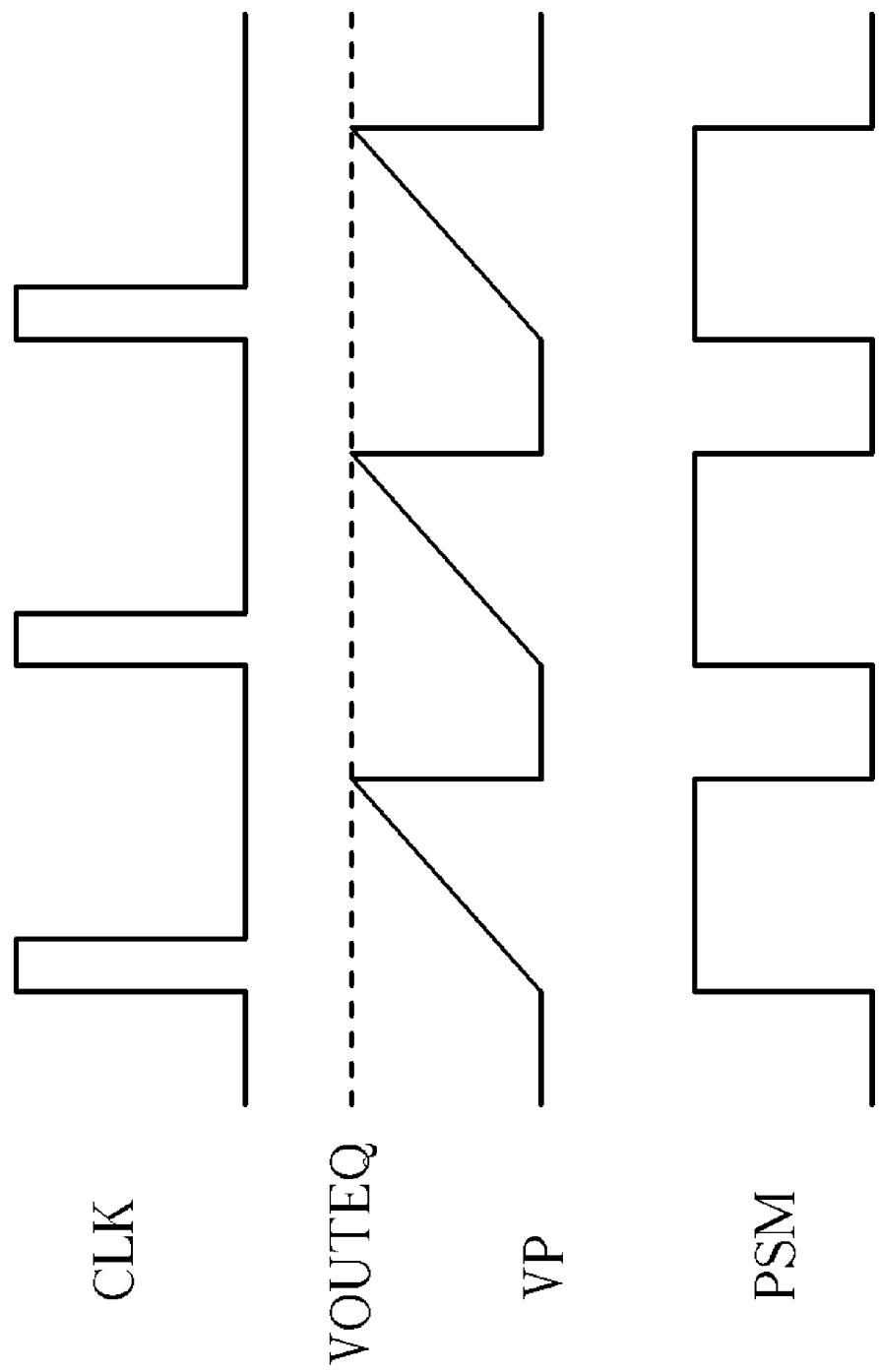
FIG. 6 depicts a schematic diagram of corresponding waveforms of the pulse-skipping-mode control circuit in accordance with FIG. 3.

As for operations of the PSM control circuit 312, please refer to FIG. 5 and FIG. 6. FIG. 5 depicts a truth table of the SR flip-flop 406, while FIG. 6 depicts waveforms corresponding to the PSM control circuit 312. In FIG. 6, waveforms shown from top to bottom represent the clock signal CLK, the DC information VOUTEQ, the voltage VP of the capacitor 402, and the PSM control signal PSM. Firstly, when the clock signal CLK is triggered, the SR flip-flop 406 operates under a setting state. The current source 400 charges the capacitor 402 until the voltage VP of the capacitor 402 is over VOUTEQ. Then, the SR flip-flop 406 switches to operate under a reset state, and the capacitor 402 starts to discharge to 0 Volt. In short, the PSM control signal is triggered by the clock signal CLK and terminated according to the condition of whether the voltage VP is over VOUTEQ or not. This means that a pulse, which is generated by the comparator 404 when the voltage VP is larger than VOUTEQ, determines a pulse width of the PSM control signal.

Since the output current, VIN/R, of the current source 400 varies with variation of the input voltage VIN, time required to reset the SR flip-flop 406 also varies with variation of the output voltage VOUT. Therefore, the pulse width of the PSM control signal varies with variation of the input voltage VIN and the output voltage VOUT. Under this circumstance, the peak current of the inductor in PSM is proportional to the current in CCM, so that no current ripples of the inductor in PSM can be larger than those in CCM. This makes the selection of the inductor more flexible.

As those skills in the art recognized, the relation between current and voltage in a capacitor can be represented as:

$$i \cdot dt = C \cdot dv$$

Thus, assumed that the capacitance of the capacitor 402 is C, and a charging period for the current source 400 to charge the capacitor 402 to the voltage VOUT is $T_{PSM}$, then:

$$\frac{VIN}{R} \cdot T_{PSM} = C \cdot VOUT \qquad \text{(Eq. 1)}$$

$$T_{PSM} = RC \cdot \frac{VOUT}{VIN}$$

Therefore, VIN, VOUT, R, and C determine the pulse width of the PSM control signal, as well as the charging period $T_{PSM}$, and VOUT/VIN is a ratio of on-time in CCM, $T_{ON}$. Therefore, by selecting appropriate values of R and C, $T_{PSM}$ can be a multiple of $T_{ON}$. For example, if $T_{PSM}$ is ½ of $T_{ON}$, the Eq. 1 becomes:

$$T_{PSM} = \frac{T_S}{2} \cdot D = \frac{Ton}{2}$$

Where VOUT/VIN=D, and $T_S$ is a unit cycle of the clock signal CLK. Under this circumstance, even if VIN and VOUT vary, $T_{PSM}$ can automatically adjust to $T_{ON}/2$.

Therefore, the pulse width of the PSM control signal varies with variation of the input voltage VIN and the output voltage VOUT of the DC-DC converter 300. The peak current of the inductor in PSM is proportional to the current intensity in CCM, so that no current ripples of the inductor in PSM can be larger than those in CCM. This makes the selection of the inductor more flexible.

Figure 7:
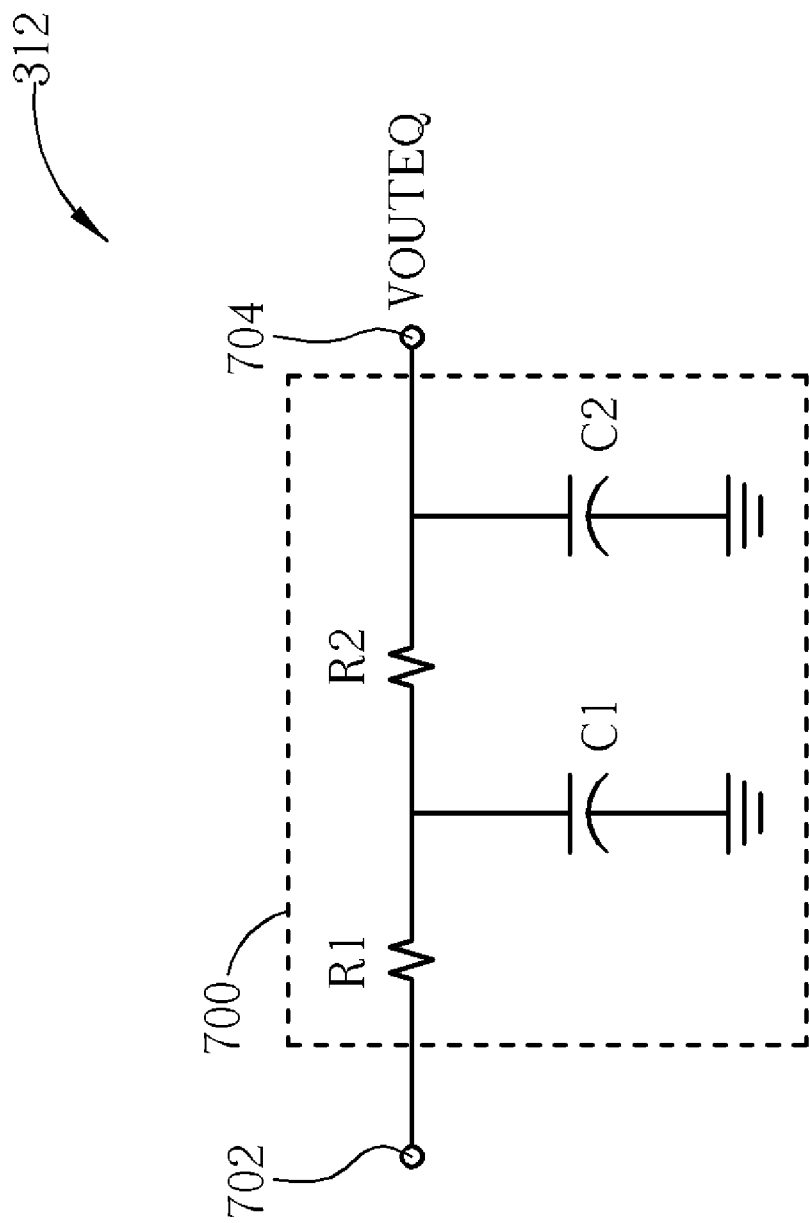
FIG. 7 depicts a schematic diagram of a low-pass filter.

According to the present invention, the converter circuit 308 is used for outputting voltage while the feedback circuit 310 is used for generating the feedback signal. Those skilled in the art can do modifications if necessary. For example, the feedback circuit 310 can include an error amplifier and a comparator. The error amplifier can amplify a difference voltage between the feedback voltage and a reference voltage for generating an error result, and thereby the comparator adjusts duty cycles of the feedback signal according to a difference between the error result and a predetermined waveform. In addition, the converter circuit 308 can adopt the same structure as the converter circuit 103, including two transistors and an inductor. The driving circuit 306 controls the transistors. Under this circumstance, in the PSM control circuit 312, the DC information of the output voltage VOUT can be obtained from an output end of the transistors of the converter circuit 308 through a low-pass filter, which provides an advantage that the DC information can be directly gained from the inside of a chip instead of an external output end. Thus, the pin number can be reduced. Certainly, the low-pass filter is not restricted to any specific types but ones capable of implementing low-pass-filtering. For example, please refer to FIG. 7, which depicts a schematic diagram of a low-pass filter 700. The low-pass filter 700 receives voltage outputted from the transistors of the converter circuit 308 via a receiving end 702. The outputted voltage is outputted from an output end 704 to the comparator 404 after being filtered by resistors R1, R2 and capacitors C1, C2.

In summary, in the present invention, according to the PSM control circuit, the pulse width of the PSM control signal varies with variation of the input and output voltage, and thereby can be automatically adjusted by itself. In this way, the peak current of the inductor in PSM can maintain a specific ratio to the current ripple in CCM so that no current ripples of the inductor in PSM are larger than those in CCM. This makes the selection of the inductor more flexible.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A DC-DC converter capable of operating in a pulse-skipping mode for transforming power provided by a power generator for a load circuit, the DC-DC converter comprising:
    a driving circuit for generating a gate driving signal according to a feedback signal and a pulse-skipping-mode control signal;
    a converter circuit coupled to the power generator, the driving circuit, and the load circuit for transforming power provided by the power generator for the load circuit according to the gate driving signal;
    a feedback circuit coupled to the driving circuit and the load circuit for generating the feedback signal for the driving circuit according to a feedback voltage of the load circuit; and
    a pulse-skipping-mode control circuit coupled to the driving circuit, the converter circuit, and the power generator for generating the pulse-skipping-mode control signal and adjusting on-time of the generated pulse-skipping-mode control signal according to voltages outputted from the power generator and the converter circuit, so as to adjust voltage outputted from the converter circuit via the driving circuit.

2. The DC-DC converter of claim 1, wherein the converter circuit comprises:
    an inductor having a first end coupled to the load circuit and a second end;
    a first transistor having a gate coupled to the driving circuit, a source coupled to the power generator, and a drain coupled to the second end of the inductor; and
    a second transistor having a gate coupled to the driving circuit, a source coupled to a system ground end, and a drain coupled to the second end of the inductor and the drain of the first transistor.

3. The DC-DC converter of claim 1, wherein the feedback circuit comprises:
    an error amplifier coupled to the load circuit for determining and amplifying a difference voltage between the feedback voltage and a reference voltage for generating an error result; and
    a comparator coupled to the error amplifier and the driving circuit for adjusting duty cycle according to a difference between the error result and a predetermined waveform.

4. The DC-DC converter of claim 1, wherein the pulse-skipping-mode control circuit comprises:
    a current source for providing a first current according to an inputted voltage;
    a capacitor coupled to the current source;
    a comparator for comparing voltage of the capacitor with information carried by voltage outputted from the converter circuit; and
    an SR flip-flop having a set end coupled to a clock generator, a reset end coupled to the comparator, and an output end coupled to the driving circuit for outputting the pulse-skipping mode control signal.

5. The DC-DC converter of claim 4 further comprising a low-pass filter coupled between the converter circuit and the comparator for filtering voltage outputted from the converter circuit, so as to output the information carried by voltage outputted from the converter circuit to the comparator.

6. The DC-DC converter of claim 5, wherein the low-pass filter comprises:
    a receiving end coupled to the converter circuit;
    an output end coupled to the comparator;
    a first capacitor;
    a second capacitor coupled to the output end;
    a first resistor coupled between the receiving end and the first capacitor; and
    a second resistor having one end coupled between the first resistor and the first capacitor and the other end coupled between the second resistor and the comparator.

7. The DC-DC converter of claim 4, wherein intensity of the first current is proportional to a voltage level of the inputted voltage.

* * * * *